US011043318B2

United States Patent
Hellman et al.

(10) Patent No.: US 11,043,318 B2
(45) Date of Patent: *Jun. 22, 2021

(54) MULTI-LAYER MAGNETIC NANOPARTICLES FOR MAGNETIC RECORDING

(71) Applicant: International Business Machines Corporation, Armonk, NY (US)

(72) Inventors: Diana J. Hellman, Tucson, AZ (US); Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 15/612,910

(22) Filed: Jun. 2, 2017

(65) Prior Publication Data

US 2017/0271058 A1 Sep. 21, 2017

Related U.S. Application Data

(63) Continuation of application No. 14/210,008, filed on Mar. 13, 2014, now Pat. No. 9,761,357.

(51) Int. Cl.
*H01F 1/00* (2006.01)
*H01F 1/147* (2006.01)
*G11B 5/712* (2006.01)

(52) U.S. Cl.
CPC .......... *H01F 1/0054* (2013.01); *G11B 5/712* (2013.01)

(58) Field of Classification Search
CPC .... H01F 1/0054; H01F 1/147; H01F 1/14708; G11B 5/66; G11B 5/712; G11B 5/3903; B22F 1/0018; B22F 1/02; B22F 1/025
See application file for complete search history.

(56) References Cited

U.S. PATENT DOCUMENTS

| | | | |
|---|---|---|---|
| 5,660,929 A | 8/1997 | Suzuki et al. | |
| 6,162,532 A | 12/2000 | Black et al. | |
| 6,909,130 B2 * | 6/2005 | Yoda | B82Y 10/00 257/295 |
| 9,761,357 B2 * | 9/2017 | Hellman | G11B 5/712 |
| 2004/0216810 A1 | 11/2004 | Iwasaki et al. | |

(Continued)

FOREIGN PATENT DOCUMENTS

JP 2007194402 A 8/2007

OTHER PUBLICATIONS

Giri et al., "AC Magnetic Properties of Compacted FeCo Nanocomposites", Mater.Phys.Mech, vol. 1, pp. 1-10. (Year: 2000).*

(Continued)

*Primary Examiner* — Matthew E. Hoban
*Assistant Examiner* — Lynne Edmondson
(74) *Attorney, Agent, or Firm* — Zilka-Kotab, P.C.

(57) ABSTRACT

According to one embodiment, a multi-layer magnetic nanoparticle includes a core; a first magnetic layer deposited on a surface of the core; a second magnetic layer deposited on a surface of the first magnetic layer, and a third magnetic layer deposited on a surface of the second magnetic layer. The core, the first magnetic layer, the second magnetic layer, and the third magnetic layer comprise different magnetic anisotropies and/or saturation magnetizations with respect to each other.

19 Claims, 8 Drawing Sheets

(56) References Cited

U.S. PATENT DOCUMENTS

| | | | |
|---|---|---|---|
| 2005/0214593 A1* | 9/2005 | Dousita | C08J 7/045 428/842.5 |
| 2006/0070491 A1* | 4/2006 | Yang | B22F 1/0018 75/255 |
| 2006/0153976 A1 | 7/2006 | Ito et al. | |
| 2009/0004475 A1* | 1/2009 | Sadaka | H01F 1/24 428/403 |
| 2009/0169866 A1 | 7/2009 | Ostafin et al. | |
| 2011/0274832 A1 | 11/2011 | Dai et al. | |
| 2012/0183811 A1 | 7/2012 | Hattori et al. | |
| 2015/0262742 A1 | 9/2015 | Hellman et al. | |

OTHER PUBLICATIONS

Gubin, editor., "Magnetic Nanoparticles", published by Wiley-VCH Verlag GmbH & Co, 9 pages. (Year: 2009).*
Northeastern University, "Nanomagnetism group", web page (http://www.northeastern.edu/nanomagnetism/research), 4 pages (Year: 2015).*
Clavero et al., "Perpendicular magnetic anisotropy in chemically disordered FePd—FeV(100) alloy thin films", Journal of Applied Physics 99, pp. 073903-1 to 073903-9. (Year: 2006).*
Hellman et al., U.S. Appl. No. 14/210,008, filed Mar. 13, 2014.
Non-Final Office Action from U.S. Appl. No. 14/210,008, dated Sep. 25, 2015.
Gayen et al., "High Temperature Magnetic Properties of Indirect Exchange Spring FePt/M(Cu,C)/Fe Trilayer Thin Films," Journal of Nanomaterials, vol. 2013, Jul. 15, 2013 pp. 1-10.
Somaskandan et al., "Surface protected and modified iron based core-shell nanoparticles for biological applications," New Journal of Chemistry, vol. 32, Oct. 25, 2007, pp. 201-209.
Gubin, "Magnetic Nanoparticles," Wiley-VCH Verlad GmbH & Co. KGaA, May 26, 2009, 9 pages.
Finazzi et al., "Low-Dimensional Antiferromagnetic Oxides: An Overview," Magnetic Properties of Antiferromagnetic Oxide Materials, 2010, pp. 1-24.
Northeastern University, "Nanomagnetism Research Group," Reasearch Webpage, Jul. 20, 2014, 4 pages.
Giri et al., "AC Magnetic Properties of Compacted FeCoNanocomposites," Mater. Phys. Mech, vol. 1, Jan. 2000, pp. 1-10.
Final Office Action from U.S. Appl. No. 14/210,008, dated Mar. 29, 2016.
Clavero et al., "Perpendicular magnetic anisotrophy in chemically disordered FePd—FeV (100) alloy thin films," Journal of Applied Physics, vol. 99, 2006, pp. 1-9.
Advisory Action from U.S. Appl. No. 14/210,008, dated May 31, 2016.
Bryukhatov et al., "Magnetic Anisotropy of Fe—Ni—Co Ferrites," phys. stat. sol. 31, 1969, pp. 407-412.
Non-Final Office Action from U.S. Appl. No. 14/210,008, dated Aug. 30, 2016.
Final Office Action from U.S. Appl. No. 14/210,008, dated Feb. 10, 2017.
Notice of Allowance from U.S. Appl. No. 14/210,008, dated May 9, 2017.
U.S. Appl. No. 14/210,008, filed Mar. 13, 2014, 2015-0262742.
List of IBM Patents or Patent Applications Treated As Related.
Boardman, R., "Anisotropy energy," Thesis, Nov. 28, 2006, 3 pages, retrieved from https://www.southampton.ac.uk/~rpb/thesis/node19.html.
Xu et al., "Enhanced film thickness for Néel wall in soft magnetic film by introducing strong magnetocrystalline anisotropy," Scientific Reports, 2016, 12 pages, retrieved from https://www.ncbi.nlm.nih.gov/pmc/articles/PMC4731761/.

* cited by examiner

MULTI-LAYER MAGNETIC NANOPARTICLES FOR MAGNETIC RECORDING

BACKGROUND

The present invention relates to data storage systems, and more particularly, this invention relates to multi-layer magnetic nanoparticles, which may be especially suited for use in magnetic recording media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a magnetic medium. For tape storage systems, this goal has led to an increase in the track and linear bit density on recording tape, and a decrease in the thickness of the magnetic tape medium.

One approach to achieve higher recording densities in magnetic media is to reduce the size of the recording bits, which typically necessitates the design of smaller and smaller components. However, miniaturization of the recoding bits and components associated therewith, while effective, presents several challenges. For instance, as the magnetic particles in a magnetic recording layer become smaller and smaller, the magnetic particles may become thermally unstable, such that thermal fluctuations result in magnetization reversal and the loss of recorded data. Increasing the magnetic anisotropy of the magnetic particles may improve the thermal stability thereof; however, an increase in the magnetic anisotropy requires an increase in the switching field needed to switch the magnetization of the magnetic particles during a write operation. Thus, the trilemma associated with magnetic recording relates to the difficulty in: (1) increasing the media signal to noise ratio (SNR); (2) maintaining media thermal stability; and (3) maintaining media write-ability.

BRIEF SUMMARY

According to one embodiment, a multi-layer magnetic nanoparticle includes a core; a first magnetic layer deposited on a surface of the core; a second magnetic layer deposited on a surface of the first magnetic layer, and a third magnetic layer deposited on a surface of the second magnetic layer. The core, the first magnetic layer, the second magnetic layer, and the third magnetic layer comprise different magnetic anisotropies and/or saturation magnetizations with respect to each other.

According to another embodiment, a product includes a magnetic recording medium having a substrate and a layer of magnetic nanoparticles deposited above the substrate, the magnetic nanoparticles having a core, a first magnetic layer deposited on a surface of the core, a second magnetic layer deposited on a surface of the first magnetic layer, and a third magnetic layer deposited on a surface of the second magnetic layer. The core, the first magnetic layer, the second magnetic layer, and the third magnetic layer comprise different magnetic anisotropies and/or saturation magnetizations with respect to each other.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 Å refers to a thickness of 10 Å±1 Å. Additionally, the term "substantially" as used in various approaches may refer to within 0 to 1% of the reference value.

The following description discloses several preferred embodiments of magnetic storage systems, as well as operation and/or component parts thereof.

The storage capacity of a magnetic recording medium may be increased by increasing the areal density of a magnetic recording layer. However, increasing the areal density of a magnetic recording layer may present challenges associated with managing the thermal stability, the write-ability and signal to noise ratio thereof.

A particulate magnetic recording layer includes an assembly of magnetic nanoparticles. The magnetization orientation of the nanoparticles stores the recorded information. To increase the recoding density of a particular magnetic recording layer, the volume of the magnetic nanoparticles may be decreased. However, reducing the volume of the magnetic nanoparticles may affect their thermal stability. The thermal stability of a magnetic nanoparticle is given by: $K_u V/k_b T$, where $K_u$ denotes the magnetic anisotropy of the nanoparticle, V is the nanoparticle volume, $k_b$ denotes the Boltzmann constant, and T denotes the temperature. Typically, $K_u V/k_b T > \sim 40$, preferably greater than ~60, to avoid thermal decay. To compensate for the reduction in volume, V, of the magnetic nanoparticles, the magnetic anisotropy ($K_u$) of the magnetic nanoparticles may be increased to maintain thermal stability. However, increasing the particle anisotropy results in an increase in the switching field (i.e. the write field) required to switch the magnetization orientation of the nanoparticles during a write operation. For single phase magnetic nanoparticles, the write field is proportional to the magnetic anisotropy constant $K_u$. Unfortunately, there is a limit to the write field that can be produced by a write transducer. The limitation comes from the saturation magnetization of the materials used to build the write transducer (e.g. maximum magnetic field value for CoFe alloys is 2.4 T).

One approach for maintaining the thermal stability and write-ability of a particulate recording layer, while also increasing the SNR, may involve including core-shell magnetic nanoparticles (i.e. nanoparticles having a core encapsulated in a shell) in the particulate recording layer. In such an approach, the core and the shell may be coupled through an exchange interaction at their interface. Preferably, the shell may have low magnetic anisotropy to assist the magnetization reversal of the magnetic core. For instance, the magnetization of the shell may preferably react easily to an applied magnetic field and exert a torque on the magnetization of the core, such that the core may reverse at a smaller applied field than a similar magnetic nanoparticle without the shell. The field assist effect of the shell may be larger in approaches where the shell has a large magnetization saturation.

However, in various approaches, the shell of these core-shell magnetic nanoparticles may be susceptible to oxidation. Accordingly, in one approach, the shell may include an oxide material (e.g. Fe3O4), which may eliminate and/or reduce such oxidation but ultimately result in the shell having a low saturation magnetization. In another approach, a non-magnetic passivation layer (e.g. C) may coat the upper surface of the shell, which while also eliminating and/or reducing such oxidation may nonetheless increase the size of the core-shell magnetic nanoparticle and provide with no magnetic advantage (e.g. no magnetization saturation of the shell to boost the field assist effect).

Accordingly, embodiments disclosed herein may overcome some of the aforementioned drawbacks by providing multi-layer magnetic nanoparticles comprising a core, and at least two magnetic layers/shells deposited above the core. In preferred approaches, the core and the at least two magnetic layers have different magnetic anisotropies and/or saturation magnetizations to reduce the switching field needed to reverse the magnetization orientation of the core, thereby enabling high density recording. In more preferred approaches, the first magnetic layer may comprise a soft, high magnetic moment intermetallic material. In still more preferred approaches, the second magnetic layer may comprise a material that is chemically inert, e.g. not susceptible to oxidation.

Following are several examples of general and specific embodiments of the multi-layer magnetic nanoparticles disclosed herein.

In one general embodiment, a multi-layer magnetic nanoparticle includes a core; a first magnetic layer deposited on a surface of the core; and a second magnetic layer deposited on a surface of the first magnetic layer, where the core, the first magnetic layer and the second magnetic layer comprise different magnetic anisotropies and/or saturation magnetizations.

In another general embodiment, a product includes a magnetic recording medium having a substrate and a layer of magnetic nanoparticles deposited above the substrate, the magnetic nanoparticles having a core; a first magnetic layer deposited on a surface of the core; and a second magnetic layer deposited on a surface of the first magnetic layer, where the core, the first magnetic layer and the second magnetic layer comprise different magnetic anisotropies and/or saturation magnetizations.

Figure 1:
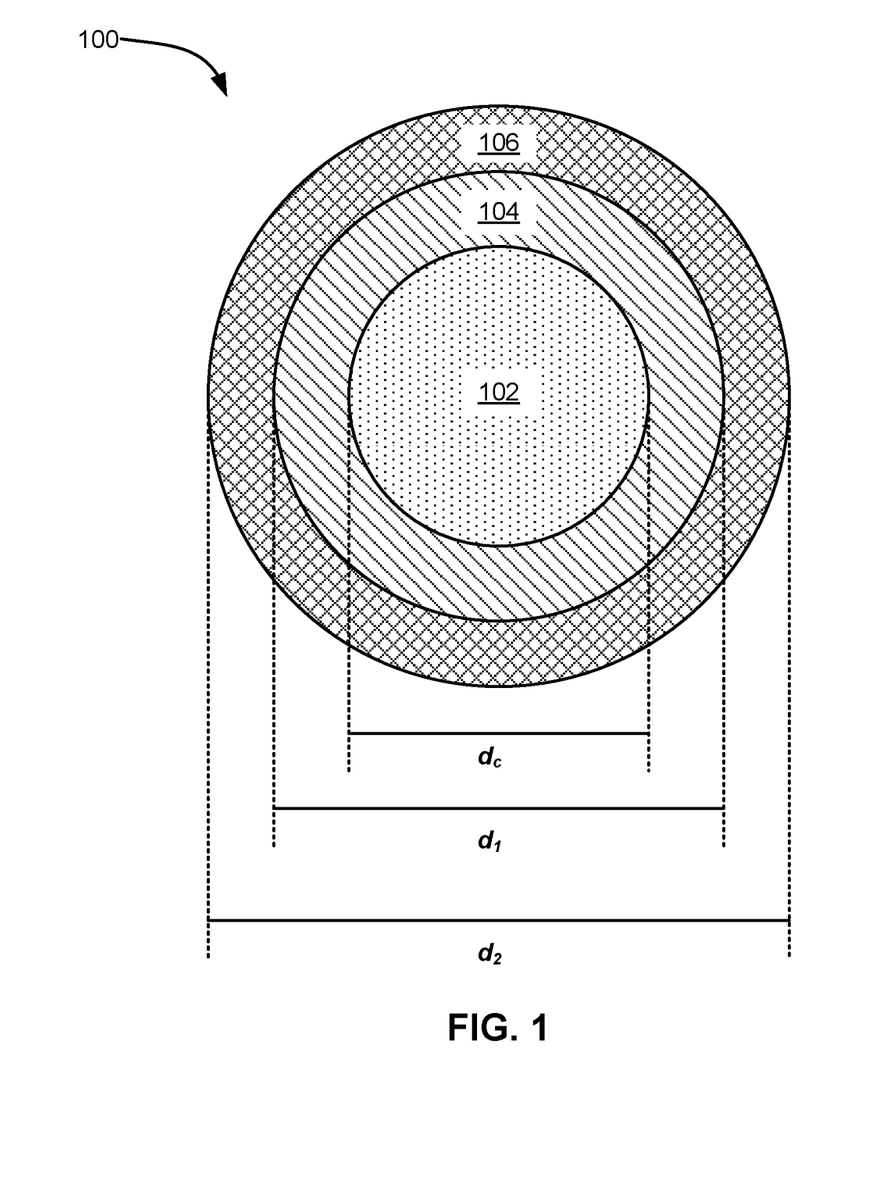
FIG. 1 is a schematic diagram of a multi-layer magnetic nanoparticle according to one embodiment.

Referring now to FIG. 1, a multi-layer magnetic nanoparticle 100 is shown according to one embodiment. As an option, the multi-layer magnetic nanoparticle 100 may be implemented in conjunction with features from any other embodiment listed herein, such as those described with reference to the other FIGS. Of course, the multi-layer magnetic nanoparticle 100 and others presented herein may be used in various applications and/or in permutations which may or may not be specifically described in the illustrative embodiments listed herein. Further, the multi-layer magnetic nanoparticle 100 presented herein may be used in any desired environment.

As shown in FIG. 1, the multi-layer magnetic nanoparticle 100 includes a core 102, a first magnetic layer 104 deposited directly on a surface of the core 102, and a second magnetic layer 106 deposited directly on a surface of the first magnetic layer 104. As particularly shown in FIG. 1, the first magnetic layer 104 substantially encapsulates the core 102, and the second magnetic layer 106 substantially encapsulates the first magnetic layer 104. In preferred approaches, the shape of the core 102, the first magnetic layer 104, and/or the second magnetic layer 106, may be spherical. However, in other approaches, the shape of the core 102, the first magnetic layer 104, and/or the second magnetic layer 106, may be non-spherical, tubular, irregular, etc. In more approaches, the overall shape of the magnetic nanoparticle 100 may be spherical, columnar, tubular, in the form of a wire, irregular, etc.

In one embodiment, the core 102 may include a material selected from a group consisting of: FePt (L10), FePd, CoPt, NdFeB, SmCo, BaFeO, and combinations thereof. In another embodiment, the core 102 may include a hard magnetic material. In yet another embodiment, the core 102 may have a magnetic anisotropy between about $1e^6$ erg/cc and $1e^8$ erg/cc. In still another embodiment, the core 102 may have a saturation magnetization ranging from about 250 emu/cc to about 2400 emu/cc. In a further embodiment, the core 102 may have a diameter, $d_c$, between about 3 to about 15 nm. Diameters noted herein refer to outer diameters unless otherwise specified.

The first magnetic layer 104, according to one embodiment, may include an intermetallic material selected from a group consisting of: Fe, Co, a Fe alloy, a Co alloy, and combinations thereof. According to another embodiment, the first magnetic layer 104 may be a soft magnetic layer. According to yet another the first magnetic layer 104 may have a magnetic anisotropy less than $1e^6$ erg/cc. According to a further embodiment, the first magnetic layer 104 may have a magnetic anisotropy that is substantially zero. According to an additional embodiment, the first magnetic layer 104 may have a magnetic anisotropy that is lower than the core 102. According to some embodiments, the first magnetic layer 104 may have a saturation magnetization that is between about 200 emu/cc and about 2400 emu/cc. According to more embodiments, the first magnetic layer 104 may have a diameter, $d_1$, between about 0.5 nm and about 5 nm.

In one embodiment, the second magnetic layer 106 includes a material that is chemically stable, e.g. does not easily oxidize. Thus, in approaches where the second magnetic layer 106 includes a chemical stable/inert material, the second magnetic layer 106 may act as a passivation layer for the innermost layers (i.e. the core 102 and the first magnetic layer 104). The second magnetic layer 106 may also include, in another embodiment, a magnetic oxide. In another embodiment, the second magnetic layer 106 may include at least one of $Fe_3O_4$, and $CoFe_2O_4$. In yet another embodiment, the second magnetic layer 106 may be a soft magnetic layer. In still another embodiment, the second magnetic layer 106 may have a magnetic anisotropy less than $1e^6$ erg/cc. In further embodiments, the second magnetic recording layer 106 may have a magnetic anisotropy that is substantially zero. In more embodiments, the second magnetic layer 106 may have a magnetic anisotropy that is substantially equal to or lower than the first magnetic recording layer 104. In yet more embodiments, the second magnetic layer 106 may have a saturation magnetization that is between about 200 emu/cc and about 2400 emu/cc. In even more embodiments, the second magnetic layer 106 may have a diameter, $d_2$, between about 0.5 nm and about 5 nm.

In preferred embodiments, the core 102 has a magnetic anisotropy that is higher/greater than the magnetic anisotropy of the first magnetic layer 104 and/or the second magnetic layer 106. In one particular approach, the magnetic anisotropy of the core 102 may be higher/greater than the magnetic anisotropy of the first magnetic layer 104 and the second magnetic layer 106, where the magnetic anisotropies of the first and second magnetic layer 104, 106 may be substantially equal, and preferably about zero.

In another approach, the magnetic anisotropy of the core 102 may be higher/greater than the magnetic anisotropy of the first magnetic layer 104, and the magnetic anisotropy of the first magnetic layer 104 may be higher/greater than the second magnetic layer 106. Thus, in this approach, the magnetic anisotropy of the core 102 and the first and second magnetic layers 104, 106 decreases in a direction extending outward from the core 102 to the second magnetic layer 106.

In other embodiments, the core 102, the first magnetic layer 104, and the second magnetic layer 106 may each comprise a different magnetic anisotropy and/or saturation magnetization.

In additional embodiments, the multi-layer magnetic nanoparticle 100 may include one or more additional magnetic layers deposited above a surface of the second magnetic layer 106. For instance, in such approaches, the multi-layer magnetic nanoparticle 100 may include a third magnetic layer deposited on a surface of the second magnetic layer 106, a fourth magnetic layer deposited on a surface of the third magnetic layer, and so on.

In various approaches, each of the above referenced one or more additional magnetic layers may have a magnetic anisotropy that is lower than the magnetic anisotropy of the core 102, the first magnetic layer 104 and/or the second magnetic layer 106. In preferred approaches, the magnetic anisotropy of the core 102, the first and second magnetic layers 104, 106, and the one or more additional magnetic layers decreases in a direction extending outward from the core 102 to the outmost additional layer. In more approaches, the outmost layer of the one or more additional magnetic layer may include a material that is chemically inert/stable, e.g. does not easily oxidize.

In further embodiment, the diameter of the multi-layer magnetic nanoparticle 100 may be between about 5 and about 20 nm.

In other embodiments, a plurality of the multi-layer magnetic nanoparticles 100 may be dispersed/embedded in a suitable matrix. In various approaches, the suitable matrix may be selected based on the particular application (e.g. magnetic recording applications, semiconductor applications, optoelectronic applications, etc.). Examples of a suitable matrix may include, but are not limited to, binder materials, ceramics, gels, semiconductors, plastics, reinforced plastics, etc. and other such materials as would be recognized by one having skill in the art upon reading the present disclosure. Moreover, a plurality of the magnetic nanoparticles 100 may be dispersed/embedded a suitable matrix to form a thin film (e.g. a magnetic recording layer) as described in more detail herein.

In more embodiments, formation of the multi-layer magnet nanoparticle 100 may be achieved via chemical approaches in a solution, chemical approaches in a sol-gel, vacuum deposition, evaporation, etc. and other suitable methods as would be understood by one having skill in the art upon reading the present disclosure.

Figure 2:
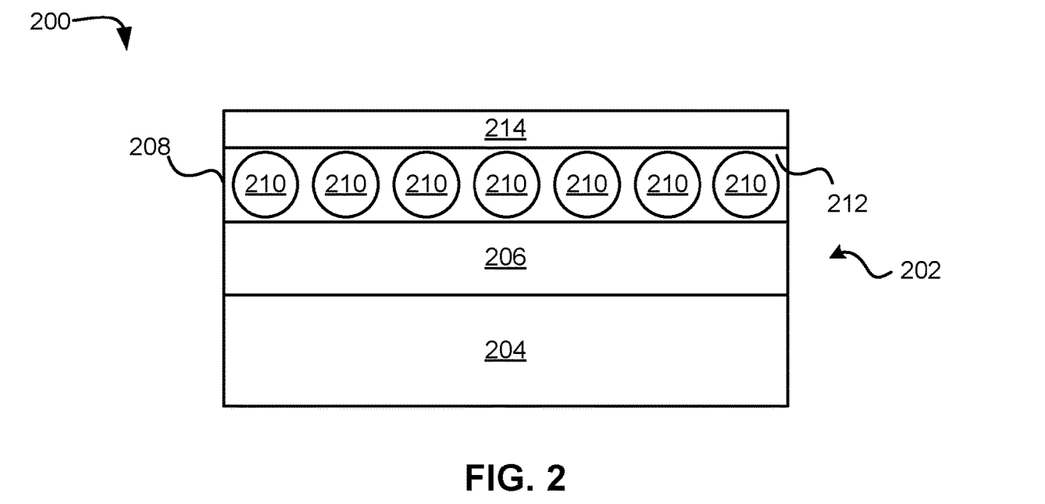
FIG. 2 is schematic diagram of a product including a magnetic recording medium according to one embodiment.

Referring now to FIG. 2, a product 200 including a magnetic recording medium 202 is shown according to one embodiment. As an option, the product 200 may be implemented in conjunction with features from any other embodiment listed herein, such as those described with reference to the other FIGS. Of course, the product 200 may be used in various applications and/or in permutations which may or may not be specifically described in the illustrative embodiments listed herein. Further, the product 200 presented herein may be used in any desired environment.

As shown in FIG. 2, the magnetic recording medium 202 includes a substrate 204, which may include glass, ceramic materials, glass/ceramic mixtures, AlMg, silicon, silicon-carbide, or other substrate material suitable for use in magnetic recording media as would be recognized by one having skill in the art upon reading the present disclosure. In one optional approach, the magnetic recording medium 202 may include an optional adhesion layer (not shown in FIG. 2) above the substrate 204 to promote coupling of layers formed thereabove.

As also shown in FIG. 2, the magnetic recording medium 202 may include one or more underlayers 206 as known in the art to promote data recording in the magnetic recording layer 208 and/or ordered formation of the magnetic recording layer 208. The magnetic recording layer 208 is positioned above the one or more underlayers 206 and is configured to record data therein.

The magnetic recording layer 208 includes a plurality of magnetic nanoparticles 210. In various approaches, each of the plurality of magnetic nanoparticles may be the multi-layer magnetic nanoparticle 100 described in FIG. 1.

With continued reference to FIG. 2, the spacing between the magnetic nanoparticles 210 may be substantially uniform, in preferred approaches. An intermediate material (e.g. a matrix, a segregant as known in the art) 212 may surround the magnetic nanoparticles 210 to isolate the magnetic nanoparticles 210 and/or maintain the substantially uniform spacing between the magnetic nanoparticles 210. In various approaches, the intermediate material 212 may include an organic compound or an inorganic compound.

In some approaches, the magnetic recording layer 208 may include a monolayer of the magnetic nanoparticles 210, as shown in FIG. 2. In other approaches, the magnetic recording layer may include one or more layers of the magnetic nanoparticles 210. The nanoparticles preferably have a substantially ordered arrangement, but may be randomly spaced, etc.

In additional approaches, formation of the magnetic recording layer 208, which has the plurality of magnetic nanoparticles 210 dispersed within, may be formed above the underlayers 206 via a spin coating method; a method involving site selective binding of the magnetic nanoparticles 210 (e.g. spin coating combined with temperature, magnetic or electrical field gradients to control the placement of the magnetic nanoparticles 210) and overcoating the magnetic nanoparticles 210 with the intermediate material 212; vacuum deposition; application of a liquid dispersion comprising the magnetic nanoparticles 212 in a solvent to a surface upon which the magnetic recording layer 208 is to be formed, and evaporating the solvent to form a layer of the magnetic nanoparticles 212 upon said surface; etc. and other such methods as would be understood by one having skill in the art upon reading the present disclosure.

As further shown in FIG. 2, the magnetic recording medium 202 may also include a protective overcoat 214 as known in the art that is configured to protect the magnetic recording layer from wear, corrosion, etc. It is important to note that the magnetic recording medium 202 may include more or less layers than those shown in FIG. 2.

In various approaches, the magnetic recording medium may be a longitudinal recording medium, a perpendicular magnetic recording media, a patterned magnetic recording medium (e.g. a discrete track medium, a bit patterned recording medium), etc. In additional approaches, the magnetic recording medium may be a magnetic tape, a magnetic disk, a magnetic card, etc.

In approaches where the magnetic recording medium 202 may be a magnetic tape, the product 200 may also include a tape drive, such as that described below.

Figure 3:
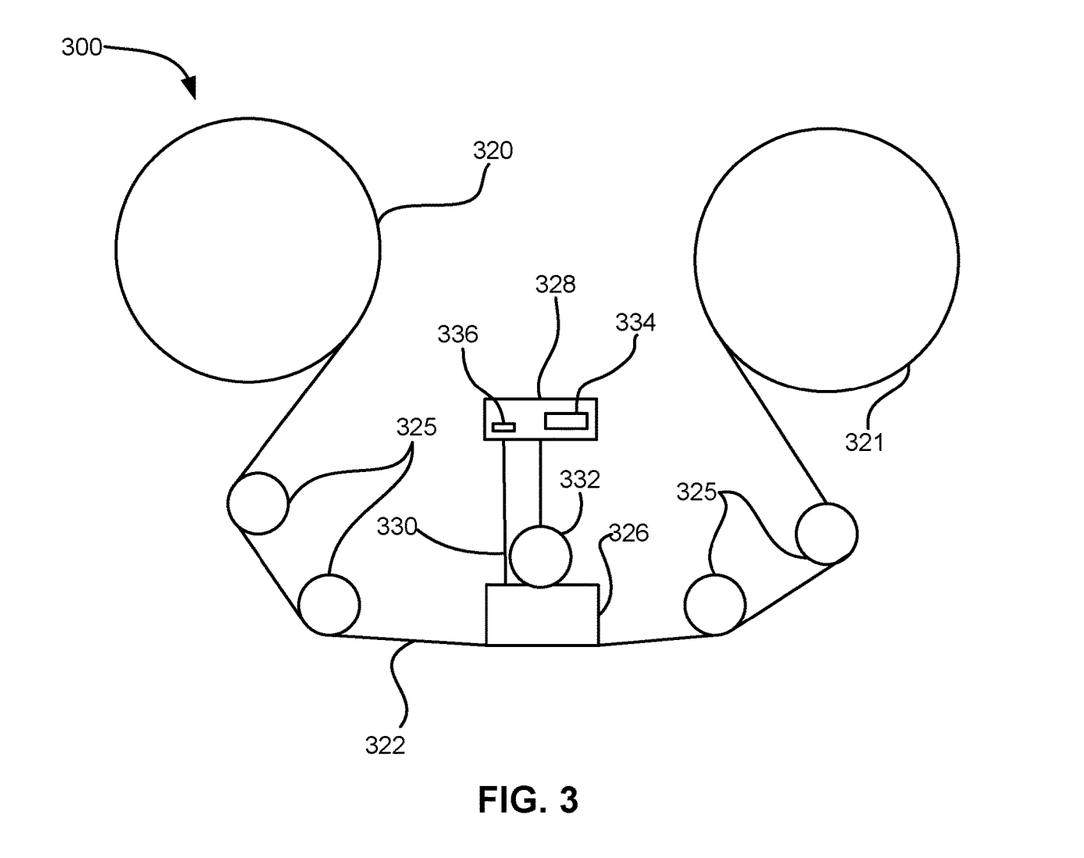
FIG. 3 is a schematic diagram of a simplified tape drive system according to one embodiment.

FIG. 3 illustrates a simplified tape drive 300, which may be employed in the context of the present invention. While one specific implementation of a tape drive is shown in FIG. 3, it should be noted that the embodiments described herein may be implemented in the context of any type of tape drive system.

As shown, a tape supply cartridge 320 and a take-up reel 321 are provided to support a magnetic tape 322. One or more of the reels may form part of a removable cartridge and are not necessarily part of the tape drive 300. The tape drive may further include drive motor(s) to drive the tape supply cartridge 320 and the take-up reel 321 to move the tape 322 over a tape head 326 of any type. This tape head may include an array of readers, writers, or both.

Guides 325 guide the magnetic tape 322 across the tape head 326. This tape head 326 is in turn coupled to a controller 328 via a cable 330. The controller 328, may be or include a processor and/or any logic for controlling any subsystem of the drive 300. For example, the controller 328 typically controls head functions such as servo following, data writing, data reading, etc. The controller 328 may operate under logic known in the art, as well as any logic disclosed herein. The controller 328 may be coupled to a memory 336 of any known type, which may store instructions executable by the controller 328. Moreover, the controller 328 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 330 may include read/write circuits to transmit data to the tape head 326 to be recorded on the magnetic tape 322 and to receive data read by the tape head 326 from the magnetic tape 322. An actuator 332 controls position of the tape head 326 relative to the magnetic tape 322.

An interface 334 may also be provided for communication between the tape drive 300 and a host (integral or external) to send and receive the data and for controlling the operation of the tape drive 300 and communicating the status of the tape drive 300 to the host, all as will be understood by those of skill in the art.

EXAMPLES

The following non-limiting examples several embodiments of multi-layer magnetic particles, such as those disclosed herein. It is important to note that the following examples are for illustrative purposes only and do not limit the invention in anyway. It should also be understood that variations and modifications of these may be made by those skilled in the art without departing from the spirit and scope of the invention.

Example 1

Example 1 concerns a simulation of a magnetic nanoparticle having a core and a single magnetic shell surrounding the core, where the core is exchange-coupled with the single magnetic shell. In this Example, the core has a 5 nm diameter, a magnetic anisotropy of $2.5e^7$ erg/cc, and a saturation magnetization of 1000 emu/cc. The magnetic properties of the core (e.g. the magnetic anisotropy and saturation magnetization) in the simulated magnetic nanoparticle of Example 1 are similar to that of FePt.

Figure 4:
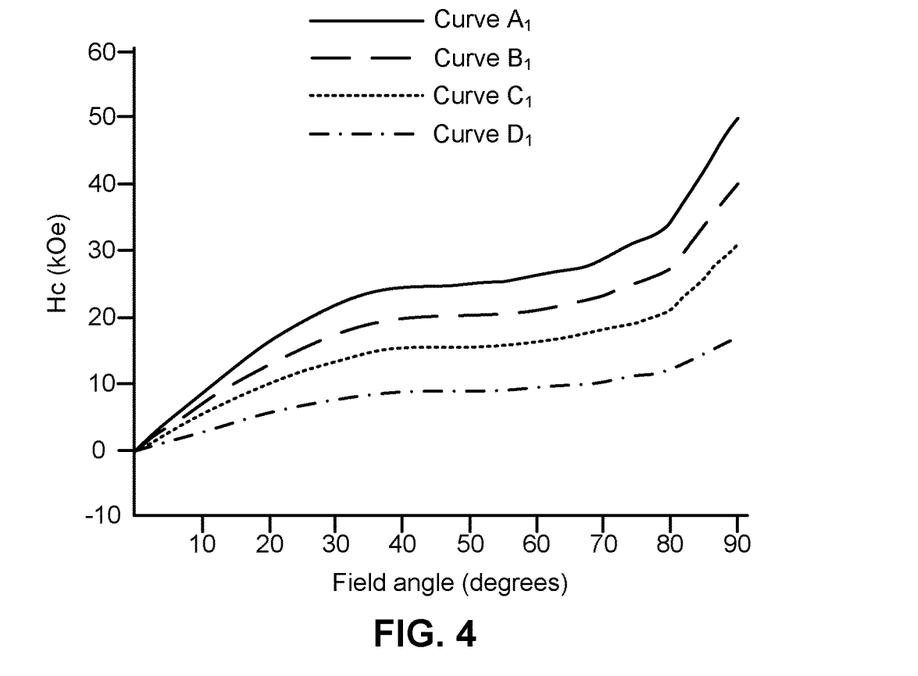
FIG. 4 is a plot coercivity of a magnetic nanoparticle having a core and a single magnetic shell versus the magnetic field angle, for increasing thicknesses of the single magnetic shell.

FIG. 4 illustrates the evolution of the magnetic nanoparticle's coercivity (Hc), as a function of field angle relative to the uniaxial, easy axis of the core, for increasing thicknesses of the single magnetic shell. Magnetic coercivity is the field required to reverse the magnetization of the nanoparticle. The field angle corresponds to the angle at which the magnetic field is applied relative to the uniaxial, easy axis of the core. The parameters (e.g. shell thickness and diameter) corresponding to each of the curves illustrated in FIG. 4 are shown in Table 1 below.

TABLE 1

| Curve | Core diameter (nm) | Shell thickness/diameter (nm) |
|---|---|---|
| $A_1$ | 5 | 0/0 |
| $B_1$ | 5 | 1.25/6.25 |
| $C_1$ | 5 | 2.5/7.5 |
| $D_1$ | 5 | 5/10 |

As shown in FIG. 4, increasing the thickness of the single magnetic shell reduces coercivity of the magnetic nanoparticle. In preferred approaches, the coercivity of the magnetic nanoparticle may be less than or equal to 20 kOe for practical magnetic recording purposes. While increasing the thickness of the single magnetic shell may better assist the magnetization reversal of the magnetic nanoparticle, such increase may also come at the expense of larger particle volume. Thus, the thickness of the single magnetic shell may need to be minimized, otherwise the overall gain in SNR due to a reduction of the nanoparticle volume cannot be met.

Figure 5:
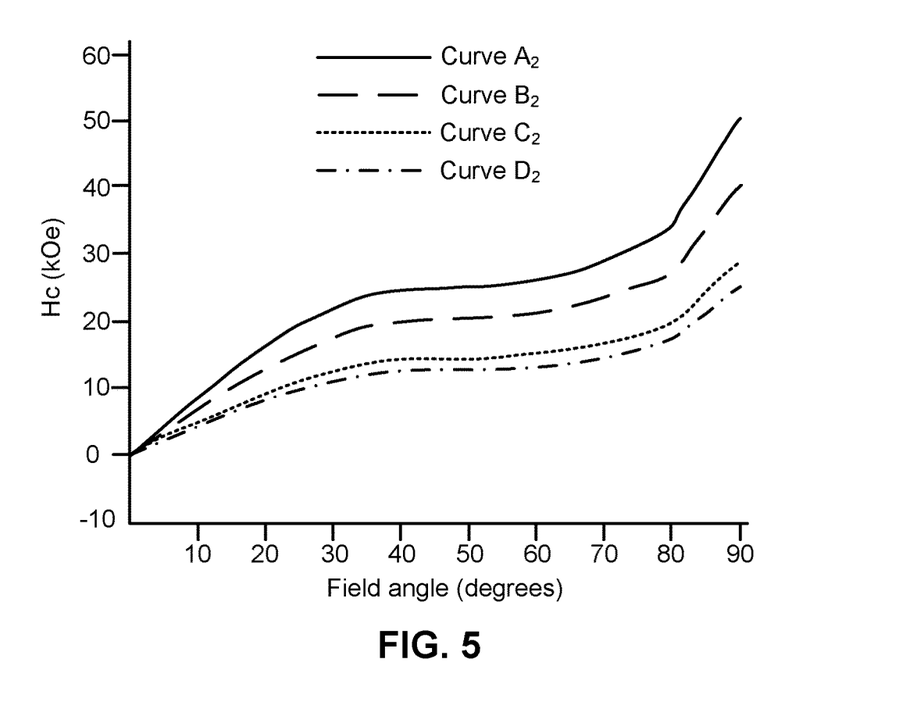
FIG. 5 is a plot of the coercivity of a magnetic nanoparticle having a core and a single magnetic shell versus the magnetic field angle, for increasing saturation magnetization of the single magnetic shell.

Accordingly, where the thickness of the magnetic shell may be minimal to reduce the overall nanoparticle volume, the magnetic shell should have a large saturation magnetization to optimally assist magnetization reversal. FIG. 5 illustrates the evolution of the magnetic nanoparticle's coercivity, as a function of field angle, for increasing saturation magnetization of the single magnetic shell having a magnetic anisotropy of zero, a thickness of 1.25 nm, and an outer diameter of 6.25 nm. The parameters (e.g. saturation magnetization (M) of the shell) corresponding to each of the curves illustrated in FIG. 5 are shown in Table 2 below.

TABLE 2

| Curve | Shell saturation magnetization, M (emu/cc) |
|---|---|
| $A_2$ | N/A (no shell) |
| $B_2$ | 250 |
| $C_2$ | 750 |
| $D_2$ | 1000 |

As shown in FIG. 5, increasing the saturation magnetization of the single magnetic shell also reduces coercivity of the magnetic nanoparticle.

Example 2

Example 2 concerns a simulation of a magnetic nanoparticle having a core and one or more magnetic shells surrounding the core, where the core is exchange-coupled with the one or more magnetic shells. In this Example, the core has a 5 nm diameter, a magnetic anisotropy of $2.5e^7$ erg/cc, and a saturation magnetization of 1000 emu/cc.

Figure 6:
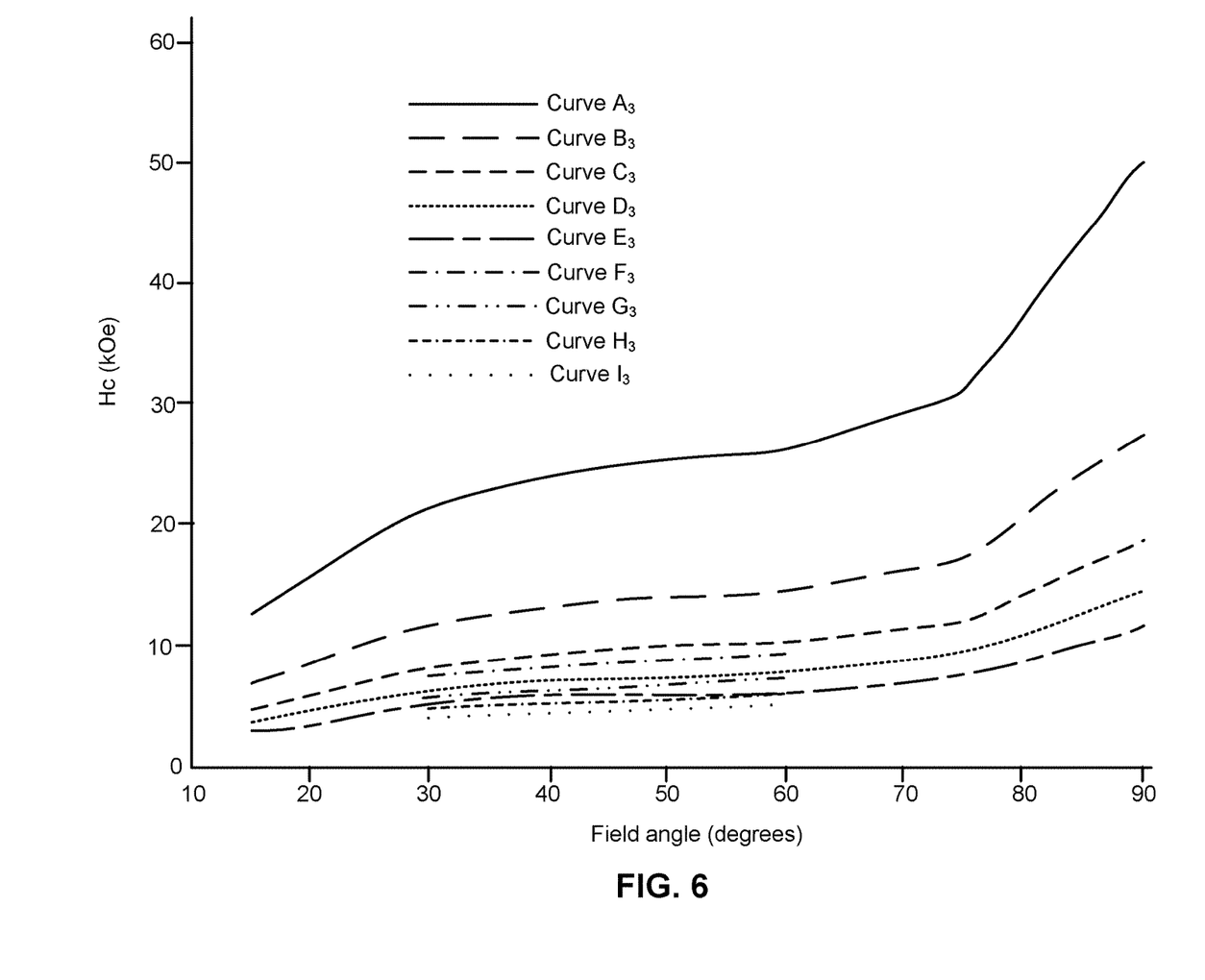
FIG. 6 is a plot of the coercivity of a magnetic nanoparticle having a core and one or more magnetic shells versus the magnetic field angle, for varying quantities, thicknesses and/or saturation magnetizations, M, of the magnetic shells.
Figure 7:
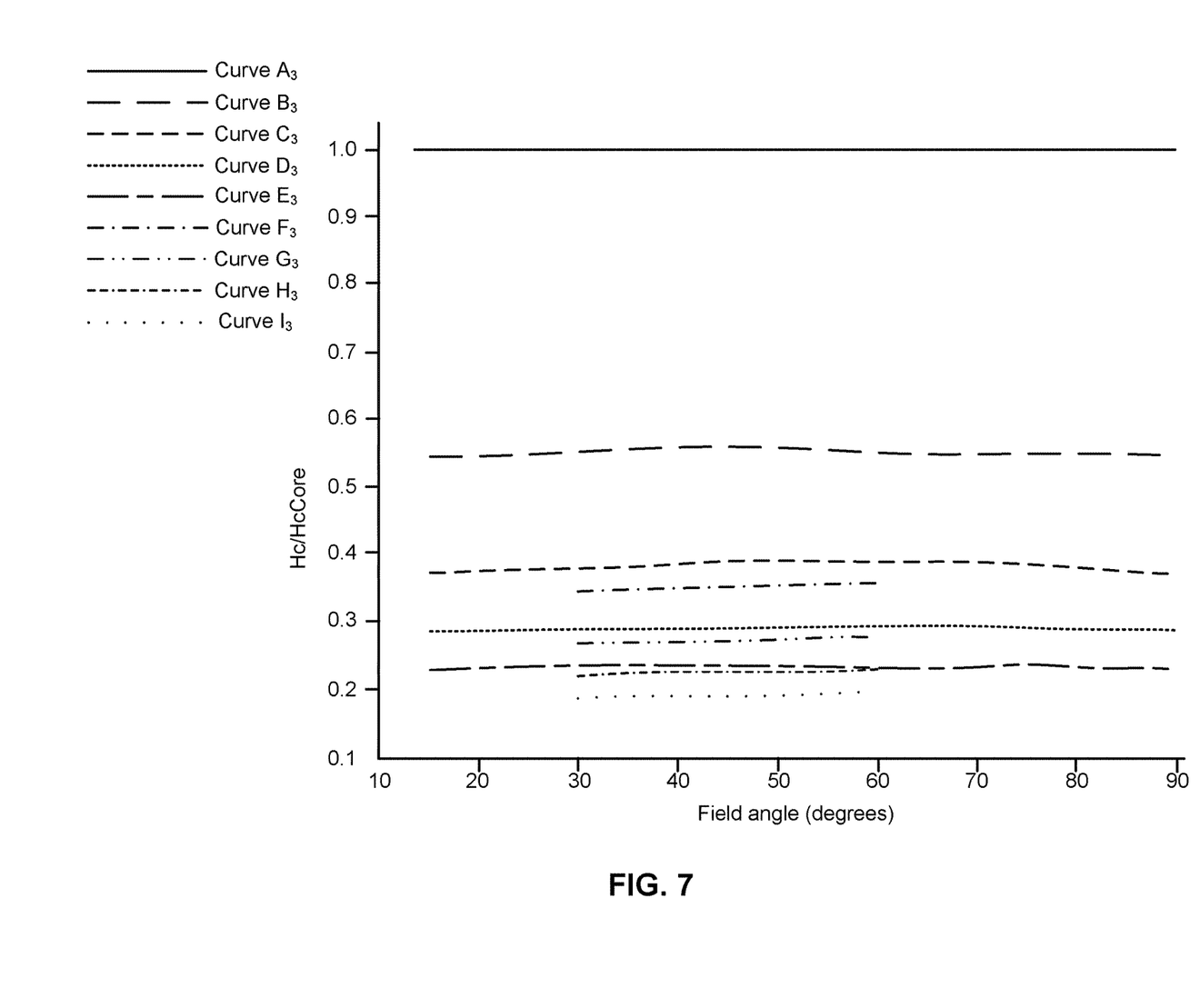
FIG. 7 is a plot of the ratio of the coercivity of a magnetic nanoparticle (Hc) to that of its core (HcCore), as a function of the magnetic field angle, for varying quantities, thicknesses and/or saturation magnetizations, M, of one more magnetic shells deposited above the core.

FIG. 6 illustrates the evolution of the magnetic nanoparticle's coercivity (Hc), as a function of field angle relative the uniaxial, easy axis of the core, for varying quantities, thicknesses and/or saturation magnetizations, M, of magnetic shells. FIG. 7 illustrates the ratio of the magnetic nanoparticle's coercivity (Hc) to that of the core (HcCore), as a function of field angle, for varying quantities, thicknesses and/or saturation magnetizations, M, of magnetic shells. The relevant and/or varying parameters (e.g. the quantity of each shell, the saturation magnetization (M) of each shell, and total nanoparticle diameter) corresponding to each of the curves illustrated in FIGS. 6 and 7 are shown in Table 3 below. It is important to note that each shell presented in curves $A_3$-$I_3$ described below has a magnetic anisotropy of zero erg/cc. Moreover, curves $F_3$-$I_3$ are only plotted over a subset of the field angles as compared to curves $A_3$-$E_3$. Finally, it is also important to note, that the first magnetic shell (shell 1) surrounds/encapsulates the core, shell 2 surrounds/encapsulates shell 2, and so on.

TABLE 3

| Curve | Shell 1 thickness (nm)/ M (emu/cc) | Shell 2 thickness (nm)/ M (emu/cc) | Total nanoparticle diameter |
|---|---|---|---|
| $A_3$ | N/A | N/A | 5 |
| $B_3$ | 0.5/250 | N/A | 6 |
| $C_3$ | 1.5/500 | 1.0/non magnetic | 10 |
| $D_3$ | 1.5/750 | 1.0/non magnetic | 10 |
| $E_3$ | 1.5/1000 | 1.0/non magnetic | 10 |
| $F_3$ | 2.5/250 | N/A | 10 |
| $G_3$ | 1.5/500 | 1.0/250 | 10 |
| $H_3$ | 1.5/750 | 1.0/250 | 10 |
| $I_3$ | 1.5/1000 | 1.0/250 | 10 |

FIGS. 6 and 7 illustrate the advantage (i.e. the reduction in the magnetic nanoparticle's coercivity) of adding a second, outer magnetic shell having a relatively low moment/ saturation magnetization as compared to having only one magnetic shell. For instance, the magnetic nanoparticles described in curves $G_3$-$I_3$, which have a first, intermediate magnetic shell (shell 1) with a high moment and a thin second, outer magnetic shell (shell 2) with a low moment, achieve a greater reduction in the nanoparticle's coercivity as compared to the magnetic nanoparticle described in curve $F_3$, which has only one, low moment magnetic shell with an equivalent thickness (e.g. a thickness equivalent to the sum of the thicknesses of shells 1 and 2 in curves $G_3$-$I_3$). In addition, FIGS. 6 and 7 illustrate the advantage of adding a second outer magnetic shell having a relatively low moment/ saturation magnetization as compared to having an equivalently thick non-magnetic protective shell. For instance, the magnetic particles described in curves $G_3$-$I_3$ achieve a greater reduction in the nanoparticle's coercivity as compared to the magnetic nanoparticles described in curves $C_3$-$E_3$.

Example 3

Example 3 concerns a simulation of a magnetic nanoparticle having a core and one or more magnetic shells surrounding the core, where the core is exchange-coupled with the one or more magnetic shells. In this Example, the core has a 5 nm diameter, a magnetic anisotropy of $2.5e^7$ erg/cc, and a saturation magnetization of 1000 emu/cc.

Figure 8:
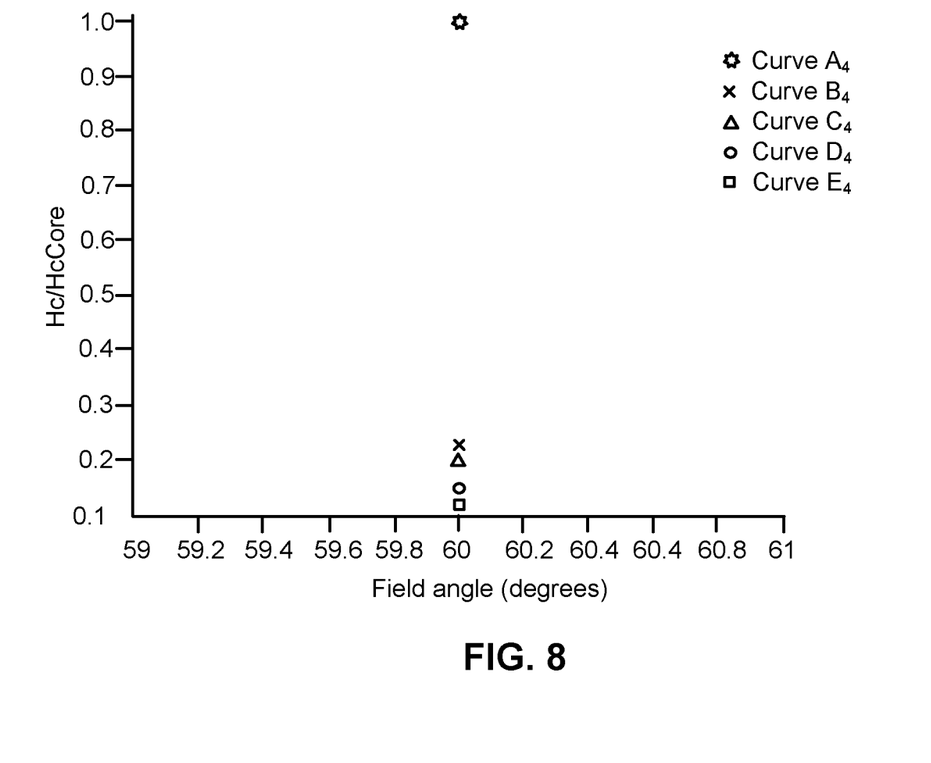
FIG. 8 is a plot of the ratio of the coercivity of a magnetic nanoparticle (Hc) to that of its core (HcCore) at a magnetic field angle of 60 degrees, for varying thicknesses and/or saturation magnetizations of one or more magnetic shells deposited above the core.

FIG. 8 illustrates the ratio of the magnetic nanoparticle's coercivity (Hc) to that of the core (HcCore), at a field angle of 60 degrees relative the uniaxial, easy axis of the core, for thicknesses and/or saturation magnetizations of the one or more shells. The relevant and/or varying parameters (e.g. the quantity of each shell, the saturation magnetization (M) of each shell, and total nanoparticle diameter) corresponding to each of the curves illustrated in FIG. 8 are shown in Table 4 below. It is important to note that each shell present in curves $A_4$-$E_4$ described below has a magnetic anisotropy of zero erg/cc. Moreover, it is also important to note, that the first magnetic shell (shell 1) surrounds/encapsulates the core, shell 2 surrounds/encapsulates shell 2, shell 3 surrounds/encapsulates shell 2, and so on.

TABLE 4

| Curve | Shell 1 thickness (nm)/ M (emu/cc) | Shell 2 thickness (nm)/ M (emu/cc) | Total nanoparticle diameter |
|---|---|---|---|
| $A_4$ | N/A | N/A | 5 |
| $B_4$ | 1.5/1000 | N/A | 8 |
| $C_4$ | 1.5/1000 | 1.0/250 | 10 |
| $D_4$ | 2.0/1000 | 0.5/250 | 10 |
| $E_4$ | 2.5/1000 | N/A | 10 |

FIG. 8 illustrates that a magnetic nanoparticle having a thin outer, magnetic shell (or a thin outer, effective magnetic shell) is advantageous for reducing the magnetic coercivity of the core. However, in various approaches, reducing the thickness of the outer magnetic shell may also lead to an increased risk of oxidation of the outer magnetic shell and, possibly, the inner magnetic shells as well. Accordingly, in some approaches, the thickness of the outer magnetic shell may be selected so as to reduce the coercivity of the core, yet still passivate the inner magnetic shells and/or prevent oxidation thereof.

Example 4

Example 4 concerns a simulation of a magnetic nanoparticle having a core, a first magnetic shell surrounding the core, and second magnetic shell surrounding the first magnetic shell, where the core is exchange-coupled with the two magnetic shells. In this Example, the core has a 5 nm diameter, a magnetic anisotropy of $2.5e^7$ erg/cc, and a saturation magnetization of 1000 emu/cc. The first magnetic shell (shell 1) also has a saturation magnetization of 1000 emu. In addition, the second magnetic shell (shell 2) has a magnetic anisotropy of zero erg/cc, and a saturation magnetization of 250 emu/cc.

Figure 9:
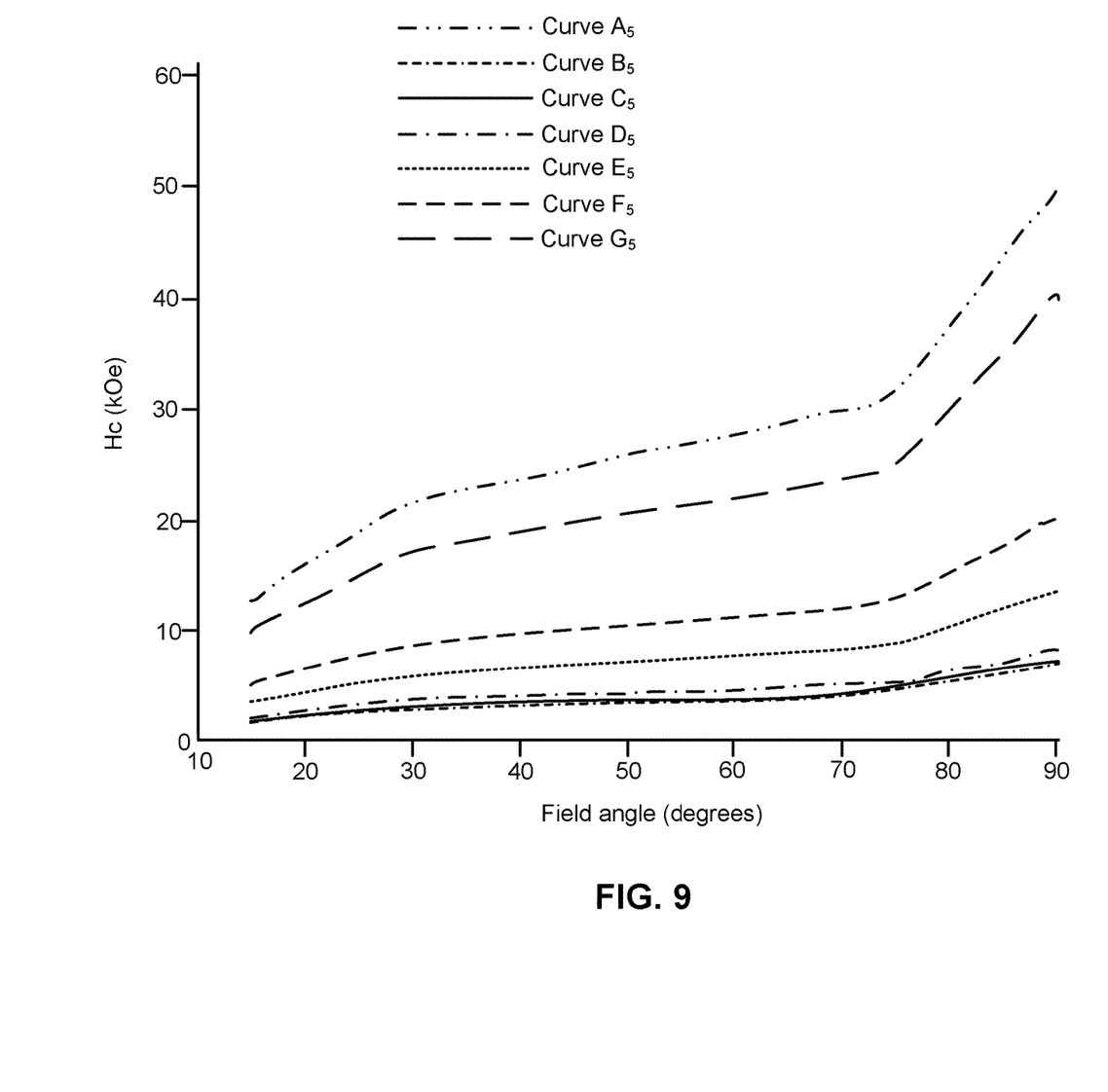
FIG. 9 is a plot of the coercivity of a magnetic nanoparticle having a core and two magnetic shells, as a function of the magnetic field angle, for varying magnetic anisotropies of the first, intermediate magnetic shell deposited directly on the core.
Figure 10:
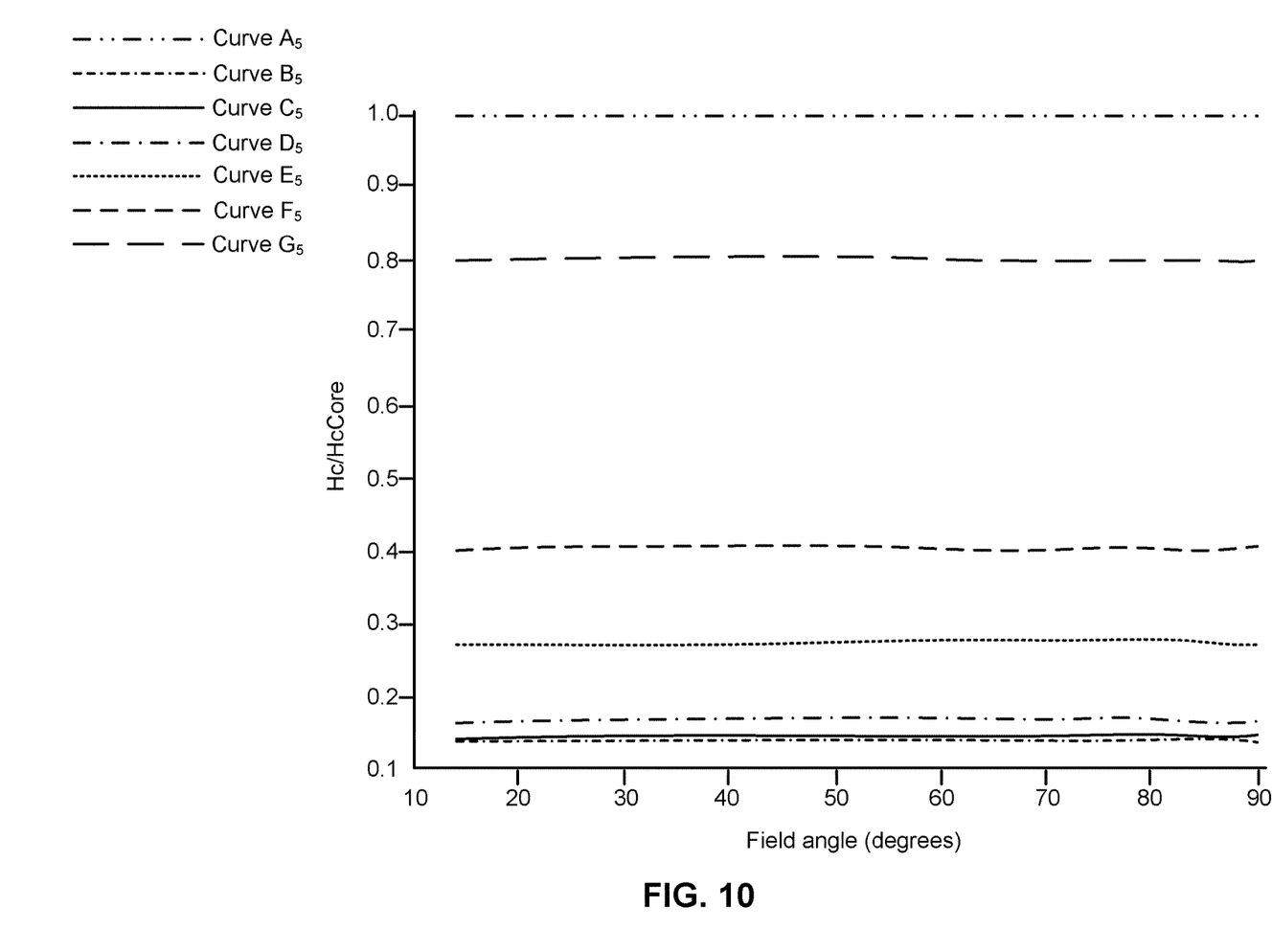
FIG. 10 is a plot of the ratio of the coercivity of a magnetic nanoparticle (Hc) to that of its core (HcCore), as a function of the magnetic field angle, for varying magnetic anisotropies of a first, intermediate magnetic shell deposited directly on the core.

FIG. 9 illustrates the magnetic nanoparticle's coercivity (Hc), as a function of field angle relative the uniaxial, easy axis of the core, for varying magnetic anisotropies of the first magnetic shell. FIG. 10 illustrates the ratio of the magnetic nanoparticle's coercivity (Hc) to that of the core (HcCore), as a function of field angle relative the uniaxial, easy axis of the core, for varying magnetic anisotropies of the first magnetic shell. The relevant and/or varying parameters (e.g. the magnetic anisotropies) corresponding to each of the curves illustrated in FIGS. 9 and 10 are shown in Table 5 below.

TABLE 5

| Curve | Shell 1: magnetic anisotropy (erg/cc) |
|---|---|
| $A_5$ | n/a (no first or second shell) |
| $B_5$ | $1e^4$ |
| $C_5$ | $1e^5$ |
| $D_5$ | $1e^6$ |
| $E_5$ | $5e^6$ |
| $F_5$ | $1e^7$ |
| $G_5$ | $2.5e^7$ |

In preferred approaches, shells 1 and 2 both have low to zero magnetic anisotropies, as smaller magnetic anisotropies may better assist the magnetization reversal of the hard magnetic core. However, as shown in FIGS. 10 and 11, a magnetic nanoparticle including a first magnetic shell with some degree of magnetic anisotropy (e.g. between about $1e^4$ to about $2.5e^7$) and a second magnetic shell having a lower magnetic anisotropy than the first magnetic shell may still be advantageous (e.g. in terms of reducing the magnetic nanoparticle's coercivity) as compared to a magnetic nanoparticle having solely a core and/or a first magnetic layer. In more preferred approaches, there is a decreasing gradient in the magnetic anisotropy ranging from the core to the outermost magnetic shells (where there are preferably at least two magnetic shells).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A multi-layer magnetic nanoparticle, comprising:
   a core;
   a first magnetic layer deposited on a surface of the core;
   a second magnetic layer deposited on a surface of the first magnetic layer, wherein the second magnetic layer is a soft magnetic layer; and
   a third magnetic layer deposited on a surface of the second magnetic layer,
   wherein the core, the first magnetic layer, the second magnetic layer, and the third magnetic layer comprise different magnetic anisotropies and/or saturation magnetizations with respect to each other,
   wherein the second magnetic layer has a lower magnetic moment than the first magnetic layer,
   wherein the magnetic anisotropy of the core is higher than the magnetic anisotropy of the first magnetic layer,
   wherein the magnetic anisotropy of the first magnetic layer is higher than the magnetic anisotropy of the second magnetic layer,
   wherein the magnetic isotropy of the second magnetic layer is higher than the magnetic anisotropy of the third magnetic layer,
   wherein the magnetic anisotropy of the third magnetic layer is substantially zero.

2. The multi-layer magnetic nanoparticle as recited in claim 1, wherein the core has a diameter between about 3 to about 13 nm.

3. The multi-layer magnetic nanoparticle as recited in claim 1, wherein the core comprises a material selected from a group consisting of: FePt, FePd, CoPt, NdFeB, SmCo, BaFeO, and combinations thereof.

4. A multi-layer magnetic nanoparticle, comprising:
a core;
a first magnetic layer deposited on a surface of the core;
a second magnetic layer deposited on a surface of the first magnetic layer, wherein the second magnetic layer is a soft magnetic layer; and
a third magnetic layer deposited on a surface of the second magnetic layer,
wherein the core, the first magnetic layer, the second magnetic layer, and the third magnetic layer comprise different magnetic anisotropies and/or saturation magnetizations with respect to each other,
wherein the magnetic isotropy of the first magnetic layer is higher than the magnetic anisotropy of the second magnetic layer,
wherein the magnetic isotropy of the second magnetic layer is higher than the magnetic anisotropy of the third magnetic layer,
wherein the magnetic anisotropy of the third magnetic layer is substantially zero.

5. The multi-layer magnetic nanoparticle as recited in claim 1, wherein the first magnetic layer comprises an intermetallic material selected from a group consisting of: Fe, Co, a Fe alloy, a Co alloy, and combinations thereof.

6. The multi-layer magnetic nanoparticle as recited in claim 1, wherein the second magnetic layer comprises a material that is chemically stable.

7. The multi-layer magnetic nanoparticle as recited in claim 1, wherein the second magnetic layer comprises a magnetic oxide.

8. The multi-layer magnetic nanoparticle as recited in claim 1, wherein the second magnetic layer comprises a material selected from the group consisting of $Fe_3O_4$, and $CoFe_2O_4$.

9. The multi-layer magnetic nanoparticle as recited in claim 1, wherein the magnetic anisotropy of the first magnetic layer is higher than the magnetic anisotropy of the second magnetic layer.

10. The multi-layer magnetic nanoparticle as recited in claim 1, wherein the magnetic anisotropy of the core is between about $1e^6$ erg/cc and $1e^8$ erg/cc.

11. The multi-layer magnetic nanoparticle as recited in claim 1, wherein the magnetic anisotropy of the first magnetic layer and/or the magnetic anisotropy of the second magnetic layer is within $1e^6$ erg/cc of zero.

12. The multi-layer magnetic nanoparticle as recited in claim 1, wherein the first magnetic layer and/or the second magnetic layer has substantially no magnetic anisotropy.

13. The multi-layer magnetic nanoparticle as recited in claim 1, wherein the saturation magnetization of the first magnetic layer and/or the second magnetic layer is between about 200 emu/cc and about 2400 emu/cc.

14. The multi-layer magnetic nanoparticle as recited in claim 1, further comprising one or more additional layers deposited above a surface of the third magnetic layer, wherein the one or more additional layer has a magnetic anisotropy that is lower than the magnetic anisotropy of the core, the first magnetic layer, the second magnetic layer and the third magnetic layer.

15. The multi-layer magnetic nanoparticle as recited in claim 1, wherein the magnetic anisotropy of the first magnetic layer is substantially zero.

16. The multi-layer magnetic nanoparticle as recited in claim 1, wherein the magnetic anisotropy of the second magnetic layer is substantially zero.

17. The multi-layer magnetic nanoparticle as recited in claim 1, wherein the magnetic anisotropy of the first magnetic layer is substantially zero,
wherein the magnetic anisotropy of the second magnetic layer is substantially zero.

18. The multi-layer magnetic nanoparticle as recited in claim 1, wherein the magnetic anisotropy of the third magnetic layer is zero.

19. The multi-layer magnetic nanoparticle as recited in claim 4, wherein the magnetic anisotropy of the third magnetic layer is zero.

* * * * *